Feb. 24, 1970
R. W. YOUNG
3,497,153
CORE SUPPORT AND DRIVE
Filed Oct. 2, 1968
2 Sheets-Sheet 1
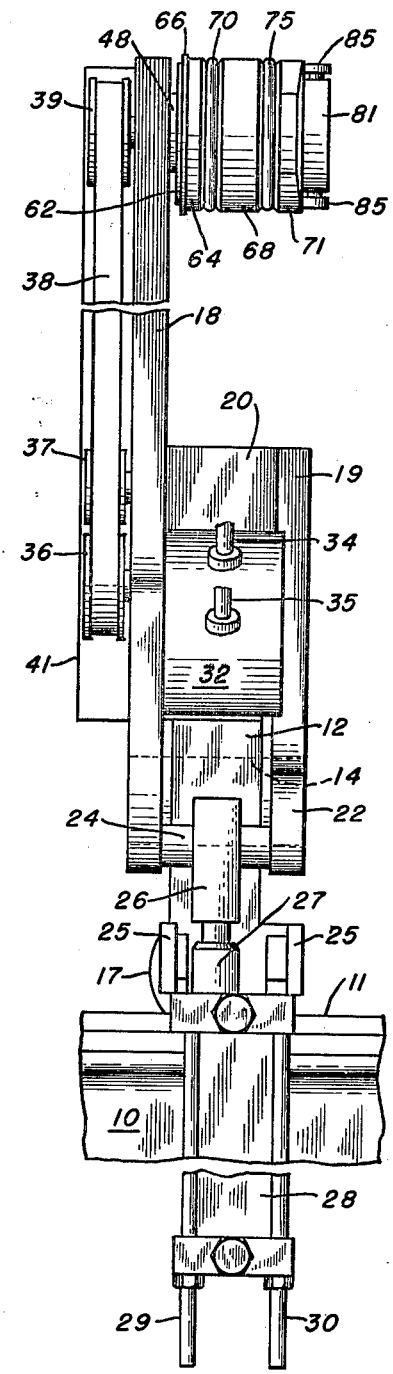
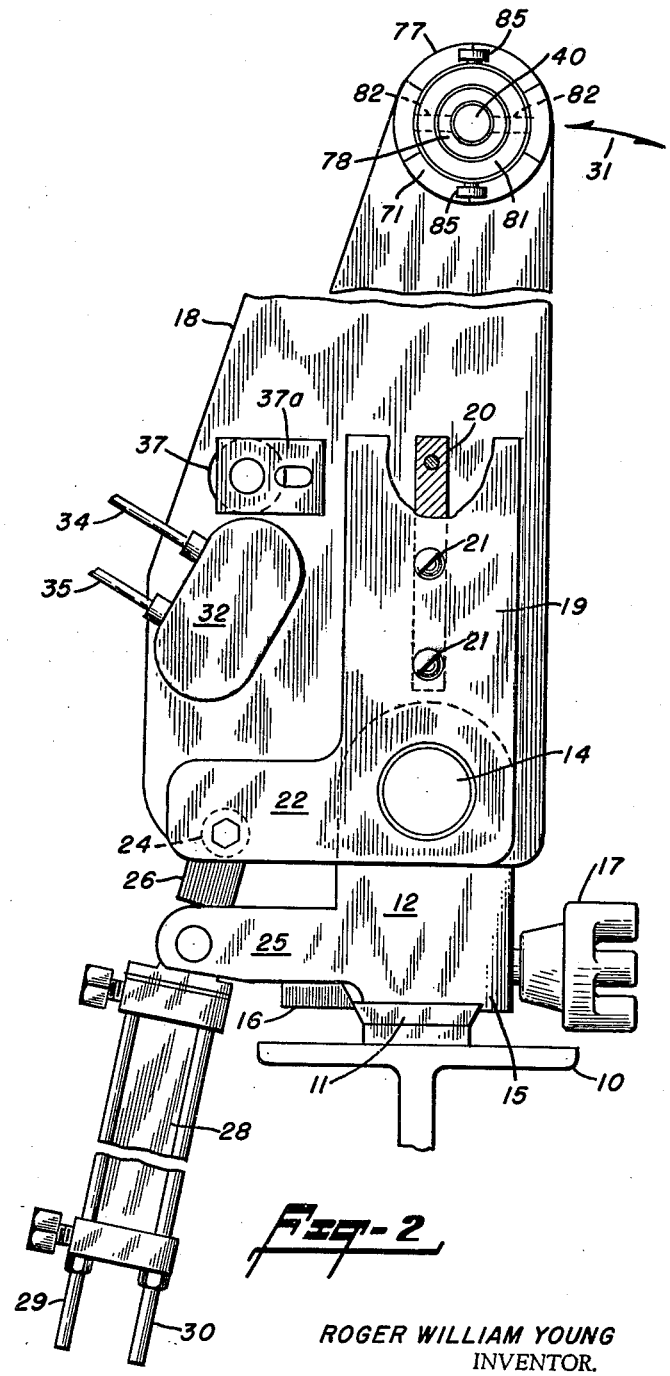
ROGER WILLIAM YOUNG
INVENTOR.
BY
Rudolph J. Lurick
ATTORNEY Feb. 24, 1970 R. W. YOUNG 3,497,153
CORE SUPPORT AND DRIVE
Filed Oct. 2, 1968 2 Sheets-Sheet 2

ROGER WILLIAM YOUNG
INVENTOR.

BY Rudolph J. Junick
ATTORNEY

United States Patent Office 3,497,153
Patented Feb. 24, 1970

3,497,153
CORE SUPPORT AND DRIVE
Roger William Young, Upper Montclair, N.J., assignor to John Dusenbery Company, Inc., Clifton, N.J., a corporation of New Jersey
Filed Oct. 2, 1968, Ser. No. 764,545
Int. Cl. B65h 17/02
U.S. Cl. 242—68.3                6 Claims

ABSTRACT OF THE DISCLOSURE

An arrangement for securing a tubular core to a drive shaft. The drive shaft extends through an inner bearing housing having an end secured to a supporting plate. Axially-spaced bearings are confined between the inner bearing housing and an outer bearing housing supporting axially-displaceable, core-supporting rings carrying a pair of garter springs, the annular face of one ring having cam surfaces formed thereon. A pair of cam rollers, rotatable with the drive shaft, engage the cam surfaces to effect displacement of the rings and an expansion of the garter springs into contact with the core.

---

The present invention relates to the transmission of rotation and is particularly concerned with means for transmitting rotation to a tube or other hollow cylindrical article, such as for example a core upon which a strip of material is to be wound.

An object of the invention is to provide an improved form of core chuck for the transmission of a rotary driving torque to a shaft contained in the chuck, in order to cause accurate winding of a web on to a core mounted upon the chuck.

A particular object of the invention is to provide an improved form of core chuck, which enables the central driving shaft of the core chuck to be maintained accurately parallel with the axis of the winding drum or other part upon which the tubular core is mounted.

A further object of the invention is to provide an improved form of core chuck in which there is no eccentricity between the chuck and the core supports.

It is difficult to provide for accurate rotation of a core mounted upon a core chuck, particularly having regard to the fact that, not only is the chuck carried by a shaft which is supported from one end only, but also that the shaft is provided at the upper extremity of an arm which is of sufficient length to enable a reel of considerable diameter to be wound up upon the core.

A particular application of the invention lies in the field of slitting machinery, in which sheet material for example a large reel of plastics film, metal foil or other web is passed through a series of guide rolls and smoothing rolls and is contacted by a plurality of slitting knives which divide the web across its width into a number of smaller webs or strips of variable sizes. It is standard practice in modern slitting machinery to wind the resultant slit strips alternately above and below the feed position or alternately to the front and to the rear of the machine, so that each alternate strip can be wound up out of contact with those adjacent to it. In a conventional centre-winding slitting machine, the strips are rewound upon cores which are mounted upon individual rewind shafts and these are driven so as to provide the necessary rewind torque. In an alternative arrangement, which is generally more preferable than centre-winding, the rollers are arranged for so-called "centre and surface winding," in which all the slit webs are rewound by having their surfaces in contact with a full-width winding drum which provides the major part, normally about 90%, of the torque needed to rewind the slit strips. Each rewind core is mounted upon an individual rewind arm and the remainder of the torque necessary for rewinding is commonly provided by individual hydraulic motors, one of which is provided for each rewind arm. A considerable advantage of the centre and surface winding arrangement is that the strips are rewound whilst in contact with the winding drum and this leads to a much more compact rewound product, because the individual strips make controllable contact with the rewinding drum, which causes air to be forced out from between the rewound plies, so that air is largely eliminated from the rewound reels, and also leads to a much tighter rewound product. If this is not done, it is possible for air to be trapped in the form of a thin layer between the successive plies and this enables the rewound strips to slip laterally when removed from the machine, so that the narrow strips in reforming do not maintain the form of right cylinders with accurately flat end surfaces. A particular advantage of the core chuck of the invention when mounted upon the rewind arms of a centre and surface slitting machine is that the mounting of the drive shaft of the core chuck from one end only, together with the accurate parallelism which can be achieved, makes the core chuck eminently suitable for centre and surface winding application and the cantilevered arrangement also enables the lateral distance occupied by each individual rewind arm to be considerably reduced, so that the centre and surface winding technique is made available for narrow widths of rewound materials which were not previously capable of being wound up by a centre and surface winding technique.

In order that the invention may be readily understood, a preferred form of core chuck for use on a rewind arm of a centre and surface web slitting and winding machine is described below, by way of example, in conjunction with the accompanying drawings, in which:

FIGURE 1 shows diagrammatically a front elevation of the major components of a rewind arm, having mounted thereon a core chuck according to the invention;

FIGURE 2 shows diagrammatically a side view of the rewind arm of FIGURE 1;

Figure 3:
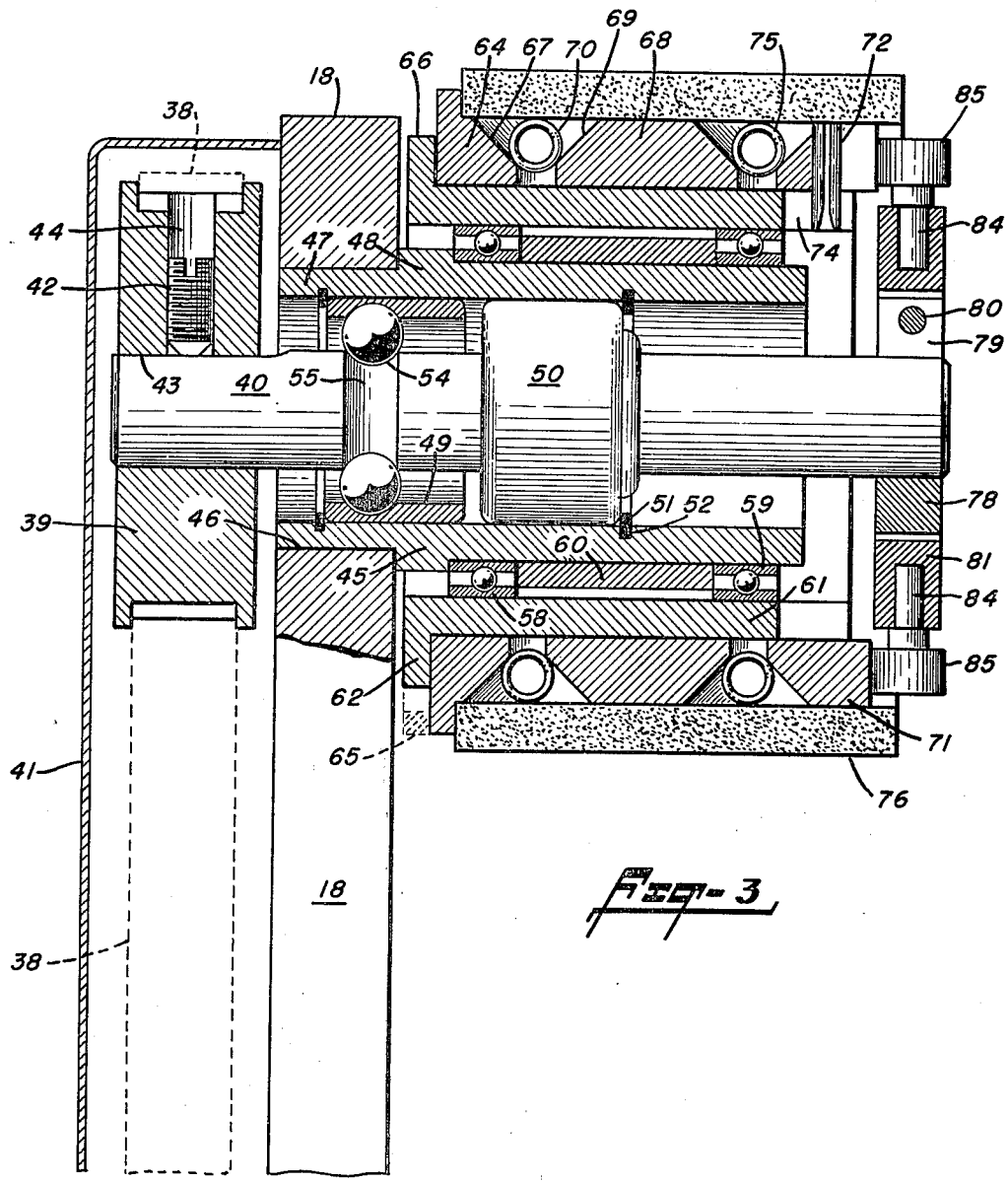
FIGURE 3 shows on an enlarged scale an axial section taken through the core chuck of FIGURES 1 and 2.

A centre and surface winding machine consists essentially of an opposed pair of side frame members, interconnected by a plurality of shafts and rollers for supporting the wound web to be slit and for supporting the individual strips into which the web has been slit and also for supporting the rollers and other rotating parts necessary. In a typical arrangement, the supporting shaft for the web, for example, a reel of plastics film 6' in width is provided at one side of the machine and is mounted for rotation between the opposed side plates and the web is trained round a series of pull rolls, together with a spreader or smoothing roll of known construction, which can take the form of a so-called "banana roll" or "Mount Hope" roll. The web is then trained round a slitting roll on which bear a plurality of slitting knives which are adjusted axially of the machine so as to slit the web into the required number of widths of slit strips and the individual slit strips are then taken partly around the surface of a winding drum. This winding drum is normally located axially of the upper part of the machine and has a bank of rewind arms mounted upon either side thereof, so that alternate slit strips can be taken round a part of the surface of the winding drum to a rewind arm either at the front or at the rear of the machine. A fixed frame member, for example a T girder, is provided at either side of the winding drum for the support of the relevant bank of rewind arms.

Such a T girder is indicated in FIGURES 1 and 2 at 10 and it carries upon its upper horizontal surface a support rail 11 of trapezoidal section, upon which a plurality of rewind arms can be mounted in an axially adjustable manner. As shown best in FIGURE 2, each rewind arm consists of a main support to block 12, which extends upwardly and forms a rigid mounting for a short horizontal spindle 14 and has a pair of horizontal projections 25 at one side, the purpose of which will be explained later. The block 12 includes an undercut lower portion 15 and has also a slidable bar 16 which is controlled by a manual clamping screw 17 so that the block 12 can be clamped upon, or unclamped from, any position of the support rail 11.

The rewind arm consists of a vertical plate 18 which is mounted at one side of the block 12 upon one end of the spindle 14 and co-operates with a smaller L-shaped side plate 19 similarly mounted upon the other end of the spindle 14 at the other side of the block 12. Between the opposed parallel portions of the vertical plate 18 and the L-shaped plate 19, a transverse web 20 is secured, for instance by means of screws 21, so as to render the rewind arm assembly extremely strong and rigid. By means of the massive mounting provided by the block 12 and the spindle 14 and the strong and rigid construction of the rewind arm itself, the plate 18 is always in a vertical plane normal to the axis of the spindle 14 and therefore normal to the axis of the support rail 11. The lower lug 22 of the L-shaped plate 19 projects parallel with the lowest part of the vertical plate 18 and the space between these houses a spindle 24 which forms the upper mounting for a cylinder and piston assembly which controls pivotal position of the rewind arm relative to the block 12 about the spindle 14. The aforementioned projections 25 provided upon the block 12 are located beneath the spindle 24 and support the upper arm of a hydraulic or pneumatic cylinder arrangement 28, the piston rod 27 of which is connected to the spindle 24 by means of a pivot block 26. The inlet and outlet to the piston and cylinder assembly 27, 28 are indicated at 29 and 30 respectively. As can be readily seen from FIGURE 2 in particular, the emission of hydraulic or pneumatic fluid into the inlet 29 causes the piston rod 27 to be displaced out from the cylinder 28 and this raises the spindle 24 and thus pivots the rewind arm about the spindle 14, relative to the position shown in FIGURE 2. Return movement enables the arm to approach the position shown in FIGURE 2 and movement of the upper end of the rewind arm is indicated by the double-ended arrow 31.

Above the lug 22, a hydraulic or other type of motor 32 is bolted to the vertical plate 18 and has inlet and outlet connections 34, 35. The motor 32 is coupled to a driving pulley 36 located at the opposite side of the vertical plate 18 from the motor 32. An adjusting pulley 37 is mounted in a slide block 37a (FIG. 2) above the driving pulley 36, so as to permit adjustment of the tension of a driving belt 38 which is trained around the pulleys 36 and 37. The driving belt 38 is also trained around a driven pulley 39 located at the upper end of the vertical plate 18 and mounted upon a driven shaft 40, which forms the main shaft of the core chuck, as described in more detail below. The driving belt 38 and its associated pulleys 36, 37 and 39 are normally enclosed in a removable housing 41 (FIGS. 1 and 3).

Referring more particularly to FIGURE 3, the driven pulley 39, which like the driving and adjusting pulleys 36, 37 is of the flanged variety, is secured to the appropriate end of the core chuck driveshaft 40 by means of a grub screw 42 located in a radial aperture 44 and bearing upon a flat surface 43 formed at the relevant end of the shaft 40. In order to support the shaft 40 for accurate rotation at the end of the vertical plate 18 of the rewind arm so that the axis of the shaft 40 is accurately normal to the plate 18, an inner bearing housing 45 is rigidly located in an aperture 46 formed in the end of the plate 18.

The inner bearing housing 45 is tubular in construction and includes an inner spigot-like end 47, which is force-fitted, brazed or welded into the aperture 46, and an integral radial flange 48 which forms an abutment surface for locating the inner bearing housing 45 in the appropriate position relative to the outer face of the plate 18. The exterior surface of the remaining part of the tube 45 forms the inner housing of a pair of spaced bearings as explained later. At spaced locations within the inner bearing housing 45, a pair of spaced ball-bearings 49, 50 are mounted, their outer races being force-fitted within the bore of the inner bearing housing 45 and, if required, held in position by means of circlips 51 lodged in suitable grooves 52 provided in the inside surface of the inner bearing housing 45. As shown for the left-hand bearing 49, the balls 54 run within a groove formed inside the bearing raceway and also are located in a peripheral groove 55 formed in the relevant part of the shaft 40. A similar groove (not shown) is provided in the shaft 40 for receiving the balls of the other bearing 50 and the shaft is therefore rigidly mounted for free rotation within the inner bearing housing 45 by virtue of the large size and number of the balls of the bearings 49 and 50 and the relatively large axial spacing of the separate bearings.

Exteriorly of the inner bearing housing 45, an axially-spaced pair of ball bearings 58, 59 are force fitted over the outside of the bearing housing 45 and a spacer sleeve 60 is located between them. The outer raceways of the bearings 58 and 59 support an outer bearing housing 61 in the form of a tubular member having a radial flange 62 formed integrally at its inner end adjacent the corresponding face of the vertical plate 18. This flange 62 forms an axially-inward stop member for a core shoulder ring 64 which is press-fitted upon the outside of the outer bearing housing 61. The annular face of the core shoulder ring 64 adjacent the flange 62 of the outer bearing housing 61 includes a flanged ring 66 which forms an inner stop for a tubular core 76 to be mounted upon the chuck as described in more detail below. The other annular face of the core shoulder ring 64 is chamfered to provide a coned surface 67 which operates with a spring expander ring 68. The ring 68 is mounted for free sliding movement upon the outer bearing housing 61 and each of its annular end faces is chamfered similarly to the coned surface 67 of the core shoulder ring 64, as shown at 69. The pair of chamfered surfaces 67 and 69 provided by the core shoulder ring 64 and the spring expander ring 68 thus provide a V-section circumferential groove in which a garter spring 70 is located. Similarly, a chamfered cam ring 71 is provided upon the outer surface of the bearing housing 61 and is secured against rotation by means of a split pin 72 which locates in a short axial slot 74 provided in the outer bearing housing 61. Another garter spring 75 is located in the V-shaped circumferential groove formed by the confronting chamfered faces of the spring expander ring 68 and the cam ring 71. It can be seen from the axial dimensions of the slot 74 that the cam ring 71 can undergo limited axial movement relative to the outer bearing housing 61 and the expander ring 68 is free to move axially between the core shoulder ring 64 and the cam ring 71. It can be appreciated that on inward axial movement of the cam ring 71 the axial adjustment is repeated by the expander ring 68 which therefore causes the garter springs 70 and 75 to expand so that their external portions occupy a larger diameter. Consequently, when a cardboard tube or other core 76 is slid on to the exterior of the chuck represented by the cylindrical outer surfaces of the core shoulder ring 64, the spring expander ring 68 and the cam ring 71 and the cam ring is moved axially, axial movement of the expander ring 68 also occurs, so that both springs are expanded equally and the outer parts of their spring turns grip the inside of the tube 76.

This axial movement is effected by virtue of the cam ring 71 which has a cammed outer annular surface 77.

In order to cause adjustment of the cam ring 71 and also to transmit the rotary movement of the shaft 40 to the core tube 76, a clamping and driving collar 78 is clamped about the outer free end of the shaft 40. This collar 78 has a radial cut 79 bridged by a set screw 80 so that the collar 78 can be fitted over and tightened upon the shaft 40. The driving collar 78 forms a mounting for gimbal ring 81 which is secured by means of an opposed pair of gimbal-mounting pins 82 shown in FIGURE 2. The mounting pins 82 are located along a diameter of the cam ring 71 and on its outer face, the gimbal ring 81 carries on the diameter at right-angles thereto mounting pins 84 for a pair of nylon cam rollers 85. As shown in FIGURE 2, the cam surface 77 of the ring 71 is divided into six radially-equal lands or cam surfaces, opposed pairs of which are respectively in a plane normal to the axis of the shaft 40 and then inclined inwardly and then inclined outwardly so as to provide a wide shallow V-shaped portion at opposite sides, representing the position of outermosts adjustment of the cam ring 71 relative to the outer bearing housing 61. This can be regarded as the normal, or starting, position of the core chuck, as the garter springs 70 and 75 are then at their least diameter and are adjusted so as normally to allow a core tube 76 to be slid freely over the outside of the chuck and up to the end stop represented by the annular flange 66.

In operation, a core tube 76 is slid on to the chuck as previously described and the hydraulic or pneumatic circuit is then operated, so as to actuate the piston and cylinder 28 and pivot the rewind arm so that the plate 18 is pivoted towards the winding roller of the centre and surface winding machine. This movement causes the outer surface of the core tube 76 to come into contact with the rewind cylinder of the machine and the consequent rapid rotation of the core tube 76 caused by this contact causes inertial spinning of the core tube, so that the cam ring 71 is rotated relative to the cam rollers 85 which therefore run from the bottoms of the Vs to the cylindrical portions, thus causing the cam ring to move axially inwards towards the vertical plate 18 and causing the garter springs 70 and 75 to expand to grip the inside of the core tube 76 as previously described. It will thus be seen that the core chuck of the invention has a very useful self-locking action. At the same time, operation of the hydraulic motor causes rotation of the shaft and the core tube 76 is thus accurately rotated, receiving some 90% of its torque by contact with the winding roller of the machine and the remainder by inertial rotation from the shaft 40. The main function of the shaft 40 is to ensure that the core tube 76 remains accurately parallel and free from eccentricity. Owing to the very rigid mounting of the shaft 40 provided by the wide axial spacing of the bearings 49, 50 which is possible with the construction described above, these desirable aims are achieved.

In case it is desired to effect locking of the core tube on the chuck manually, the flange 66 can advantageously have a greater axial width, as shown in dotted lines at 65 and the exterior of the cylindrical surface so provided can usefully be knurled, so that the ring 64 can be gripped while the gimbal ring 81 is turned to lock the core tube in place.

The advantages of the rotary transmission mounting in accordance with the invention include the following:

(1) The drive shaft is maintained accurately parallel with the winding drum;

(2) The arm is constructed so that it retains accurate parallelism throughout its pivotal movement, it being appreciated that as the slit strip is wound up on the core tube, the radius of the core being wound up in contact with the winding roller increases so that the arm gradually returns to its starting position illustrated in FIGURE 2;

(3) The cam ring arrangement described enables the core tube to be grasped very firmly so that it resists the torque provided by the shaft 40 and also close control is maintained with regard to possible eccentricity between the core and the core chuck. This enables the strips to be rewound accurately and known disadvantages such as looping are avoided;

(4) It is simple to remove the finished roll from the core chuck as this can readily be achieved by rotating the gimbal ring, (using the knurling on the surface 65, for example) so as to allow the cam ring to move axially under the inherent tendency for inward relief of the garter springs;

(5) A new core can equally easily be inserted and advantage can desirably be taken of the self-locking action mentioned above.

Although the invention has been described as having a cantilever mounting for the chuck drive shaft, a mounting consisting of two parallel arms may be used, as shown in U.S. Patent No. 3,122,335, Feb. 25, 1964, and entitled Web Slitter-Rewinder.

The invention thus provides a very accurate and reliable form of core chuck, for particular application to the rewind arms of slitting machines of the centre and surface winding type, but which can also be advantageously made use of in a wide variety of machines where the transmission of rotation with accurate parallelism is desired.

What I claim is:

1. A core chuck for securing a tubular core to a drive shaft comprising,
   (a) a fixed inner bearing housing through which the drive shaft extends,
   (b) an outer bearing housing,
   (c) axially-spaced bearings confined between the inner and outer bearing housings,
   (d) axially-aligned core-supporting members slidably displaceable along the outer bearing housing,
   (e) spring means carried by the core-supporting members and movable into contact with the core upon displacement of the core-supporting members, and
   (f) cooperating means on the drive shaft and core-supporting members to effect axial displacement of the core-supporting members upon rotation of the drive shaft relative to the core-supporting members.

2. The invention as recited in claim 1, wherein the inner bearing housing is secured to a supporting arm and wherein the drive shaft is supported by axially-spaced bearings carried by the inner bearing housing.

3. The invention as recited in claim 1, wherein the core-supporting members are spaced end rings, wherein the proximate annular faces of the rings are chamfered to provide substantially V-section circumferential grooves, and wherein said spring means is a garter spring disposed within each of the grooves.

4. The invention as recited in claim 3, wherein the said cooperating means comprises cam surfaces formed on the annular face of one end ring and rollers carried by the drive shaft and having peripheral surfaces in engagement with the cam surfaces.

5. The invention as recited in claim 4, wherein one end of said outer bearing housing terminates in an outwardly-extending flange and the other end has a longitudinal slot formed therein, wherein the said one end ring is secured against rotation about the outer bearing housing by means of a pin extending into the said slot, and wherein the other end ring has an outwardly-extending flange disposed proximate to the flange on the outer bearing housing.

6. A core chuck for securing a tubular core to a drive shaft comprising,
   (a) an inner bearing housing having an end secured to a supporting arm,
   (b) axially-spaced bearings carried by the inner bearing housing, said drive shaft being supported by said bearings and extending through the inner bearing housing,
   (c) an outer bearing housing concentric with the inner bearing housing, said outer bearing housing having a longitudinal slot formed in one end and an external flange at the other end, (d) axially-spaced bearings confined between the said bearing housings, (e) a plurality of axially-spaced core-supporting rings carried by the outer bearing housing, the proximate annular faces of said rings being chamfered to provide V-section circumferential grooves, one end ring having an external flange proximate to the flange of the outer bearing housing, the other end ring carrying a pin which extends into the said slot and the outer annular face of such end ring having a plurality of cam surfaces formed therein, (f) a garter spring disposed in each groove, (g) a collar secured to the drive shaft, and (h) rollers carried by the collar and having peripheral surfaces in engagement with the said cam surfaces.

References Cited

UNITED STATES PATENTS

| 2,992,787 | 7/1961 | Craig | 242—68.3 X |
| 3,249,314 | 5/1966 | Kjos | 242—68.3 |
| 3,272,451 | 9/1966 | Pendleton | 242—68.3 |

NATHAN L. MINTZ, Primary Examiner